US012633997B2

(12) United States Patent 　　　(10) Patent No.: US 12,633,997 B2
Sharma et al. 　　　(45) Date of Patent: *May 19, 2026

(54) COMMUNICATIONS DEVICE AND METHOD

(71) Applicant: Sony Group Corporation, Tokyo (JP)

(72) Inventors: Vivek Sharma, Basingstoke (GB);
Martin Warwick Beale, Basingstoke
(GB); Yuxin Wei, Basingstoke (GB);
Shin Horng Wong, Basingstoke (GB);
Yassin Aden Awad, Basingstoke (GB)

(73) Assignee: Sony Group Corporation, Tokyo (JP)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/779,303

(22) Filed: Jul. 22, 2024

(65) Prior Publication Data

US 2024/0380477 A1 　　Nov. 14, 2024

Related U.S. Application Data

(63) Continuation of application No. 17/427,931, filed as
application No. PCT/EP2020/051996 on Jan. 28,
2020, now Pat. No. 12,047,153.

(30) Foreign Application Priority Data

Feb. 14, 2019　(EP) ..................................... 19157287

(51) Int. Cl.
*H04B 7/08*　　　(2006.01)
*H04W 24/10*　　(2009.01)
(Continued)

(52) U.S. Cl.
CPC ......... *H04B 7/0857* (2013.01); *H04B 7/0888*
(2013.01); *H04W 24/10* (2013.01); *H04W*
*36/0085* (2018.08); *H04W 72/542* (2023.01)

(58) Field of Classification Search
CPC ............... H04B 7/0857; H04B 7/0888; H04W
36/0085; H04W 24/10; H04W 72/542
(Continued)

(56) References Cited

U.S. PATENT DOCUMENTS

2019/0182702 A1* 6/2019 Wang ................ H04W 28/0221
2019/0320490 A1* 10/2019 Liu ........................ H04W 24/10

OTHER PUBLICATIONS

Holma et al., "LTE for UMTS OFDMA and SC-FDMA Based
Radio Access", John Wiley and Sons, 2009, pp. 25-27.
(Continued)

*Primary Examiner* — Leila Malek
(74) *Attorney, Agent, or Firm* — XSENSUS LLP

(57) ABSTRACT

A method of operating a communications device for com-
municating data via a wireless communications network
comprises detecting one or more of a plurality of beams of
radio signals transmitted by the wireless communications
network. The method comprises determining whether a
received signal strength of the radio signals of each of the
one or more beams exceeds a first evaluation threshold,
identifying a sub-set of the set of detected beams of radio
signals which can be used to receive data carried by the radio
signals of the beam for which the received signal strength
exceeds the first evaluation threshold, and entering a relaxed
radio measurement state in which the communications
device reduces an amount of attempted measurements of the
plurality of beams of radio signals compared with a normal
state according to one or more relaxed measurement state
criteria.

20 Claims, 6 Drawing Sheets

(51) Int. Cl.
  H04W 36/00 (2009.01)
  H04W 72/542 (2023.01)
(58) Field of Classification Search
  USPC ........................................................ 375/346
  See application file for complete search history.

(56) References Cited

OTHER PUBLICATIONS

Nokia et al., "Support for Beam Based Common Control Plane", 3GPP TSG-RAN WG1#85, R1-165364, May 23-27, 2016, 5 pages.
NTT Docomo, "New SID Proposal: Study on New Radio Access Technology", 3GPP TSG RAN Meeting #71, RP-160671, Mar. 7-10, 2016, 8 pages.
Catt et al., "New SID: Study on UE Power Saving in NR", 3GPP TSG RAN Meetings #80, RP-181463, Jun. 11-14, 2018, 5 pages.
3GPP, "NR; Physical Layer Measurements (Release 15)", 3GPP TS 38.215 V15.4.0, Dec. 2018, pp. 1-15.
3GPP, "NR; User Equipment (UE) Procedures in Idle Mode and RRC Inactive State (Release 15)", 3GPP TS 38.304 V15.2.0, Dec. 2018, pp. 1-28.
Sony, "Reduction in RRM Measurements for UE Power Saving", 3GPP TSG RAN WG1 AH1901, R1-1900382, Jan. 21-25, 2019, 6 pages.
VIVO, "Summary of UE Power Consumption Reduction in RRM Measurements", 3GPP TSG RAN WG1 Meeting #19AH1, R1-1901339, Jan. 21-25, 2019, 36 pages.
Sony, "RRM Measurements for UE Power Saving", 3GPP TSG RAN WG2 Meeting# 105, R2-1901427, Feb. 25-Mar. 2, 2019, 4 pages.
3GPP, "Evolved Universal Terrestrial Radio Access (E-UTRA); User Equipment (UE) Procedures in Idle Mode (Release 15)", 3GPP TS 36.304 V15.2.0, Dec. 2018, pp. 1-55.
Mediatek Inc. "Report of Email Discussion [105bis#29][NR/Power Saving] RRM Solutions", 3GPP TSG-RAN WG2 Meeting #106, R2-1908249, May 13-17, 2019, 20 pages.
Qualcomm Incorporated, "Discussion on Open Issues in WUS RRM in NB-IoT", 3GPP TSG-RAN WG4 Meeting #87, R4-1806864, May 21-25, 2018, pp. 1-3.
International Search Report and Written Opinion mailed on Apr. 7, 2020, received for PCT Application No. PCT/EP2020/051996, Filed on Jan. 28, 2020, 13 pages.

* cited by examiner

COMMUNICATIONS DEVICE AND METHOD

CROSS-REFERENCE TO RELATED APPLICATIONS

The present application is a continuation of U.S. application Ser. No. 17/427,931, filed Aug. 3, 2021, which is based on PCT filing PCT/EP2020/051996, filed Jan. 28, 2020, which claims priority to EP 19157287.4, filed Feb. 14, 2019, the entire contents of each are incorporated herein by reference.

BACKGROUND

Field of the Present Technique

The present disclosure relates to communications devices configured to perform radio resource management measurements of a wireless communications network and methods of operating a communications device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present technique.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

There is therefore expected to be a desire for future wireless communications networks, which may be referred to as 5G or new radio access technology networks (NR), to support connectivity for a wide range of devices associated with different applications. Furthermore it is expected that wireless communications networks configured in accordance with new Radio Access Technology (RAT) will employ beam forming using directional antenna arrays to improve coverage, provide higher data rates and make more efficient use of communications resources. However the use of beam forming may also give rise to new challenges, particularly in respect of power management.

SUMMARY OF THE PRESENT TECHNIQUE

The present disclosure can help address or mitigate at least some of the issues discussed above.

Embodiments of the present technique can provide a method of operating a communications device for communicating data via a wireless communications network. The method comprises detecting one or more of a plurality of beams of radio signals transmitted by the wireless communications network, the one or more beams of the radio signals which have been detected forming a set of one or more detected beams of radio signals from the plurality of beams of radio signals transmitted from the wireless communications network. The method further comprises determining whether a received signal strength of the radio signals of each of the one or more beams of the set of detected beams exceeds a first evaluation threshold, identifying a sub-set of the set of detected beams of radio signals which can be used to receive data carried by the radio signals of the beam for which the received signal strength exceeds the first evaluation threshold, and entering a relaxed radio measurement state in which the communications device reduces an amount of attempted measurements of the plurality of beams of radio signals compared with a normal state according to one or more relaxed measurement state criteria, and when in the relaxed radio measurement state, determining a reference measurement level based on a signal strength of the radio signals of the sub-set of beams of radio signals having the signal strength which exceeds the first evaluation threshold. The method further comprises determining whether the communications device should remain in the relaxed radio measurement state by comparing a difference between the reference measurement level and the current measurement level with a second delta threshold, wherein the second delta threshold is set dynamically by the communications device according to a number of the detected beams of the radio signals in the set of detected beams of radio signals.

Embodiments of the present technique can therefore provide an arrangement in which a communications device can dynamically configure a delta threshold parameter with respect to which the device assesses whether to remain in a relaxed radio resource management (RRM) measurement state as a function of a number beams of radio signals which it can detect. As a result the communications device can react to a number of beams which it can detect to reflect a likelihood of switching beams so that it can use a power saving RRM relaxed measurement procedure without compromising RRM and mobility management.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily understood by reference to the following detailed description of example embodiments with reference to the accompanying drawings wherein like reference numerals designate identical or corresponding parts throughout the several views, and wherein.

DESCRIPTION OF EXAMPLE EMBODIMENTS

Long Term Evolution Advanced Radio Access Technology (4G)

Figure 1:
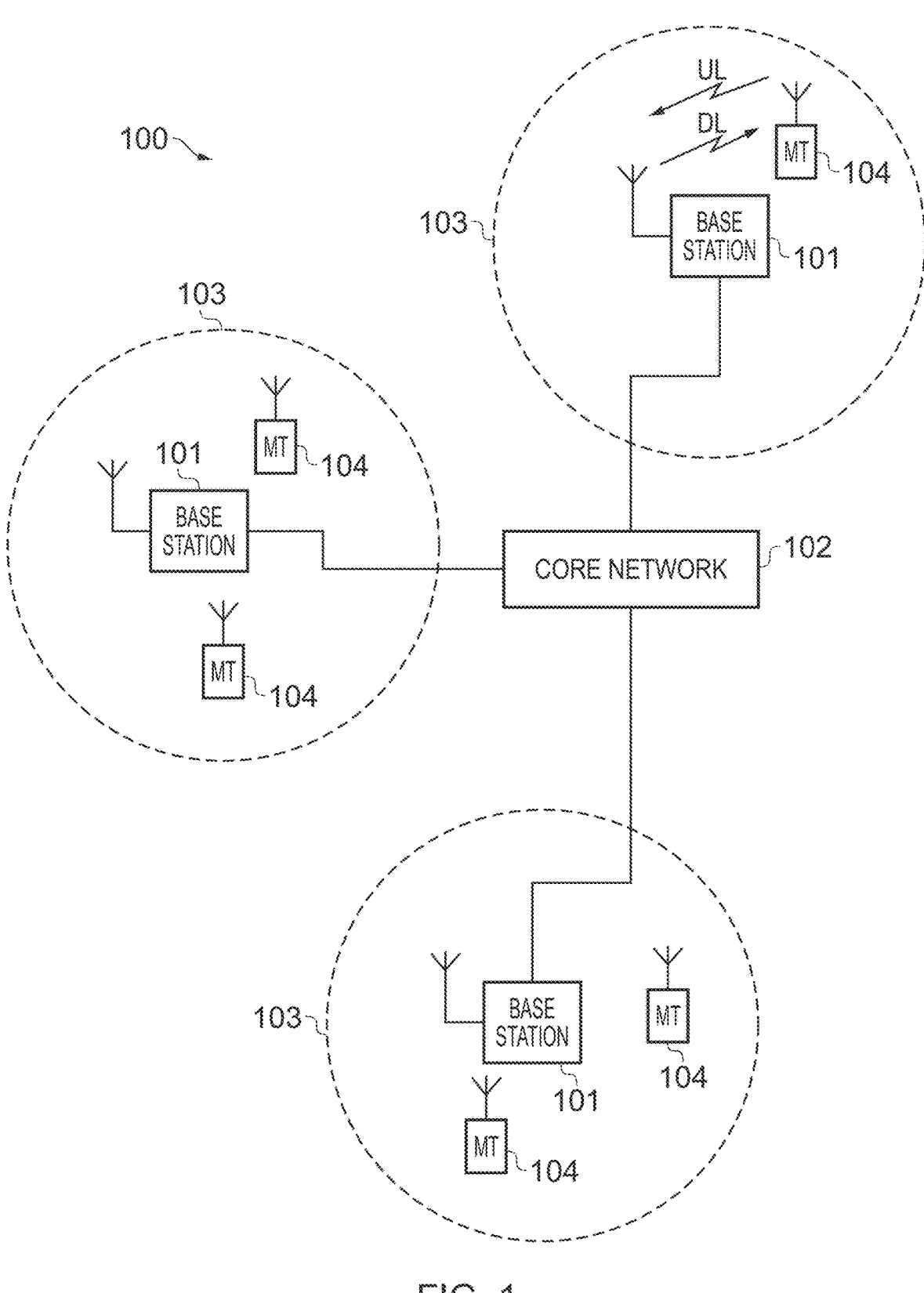
FIG. 1 schematically represents some aspects of an LTE-type wireless communication system.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
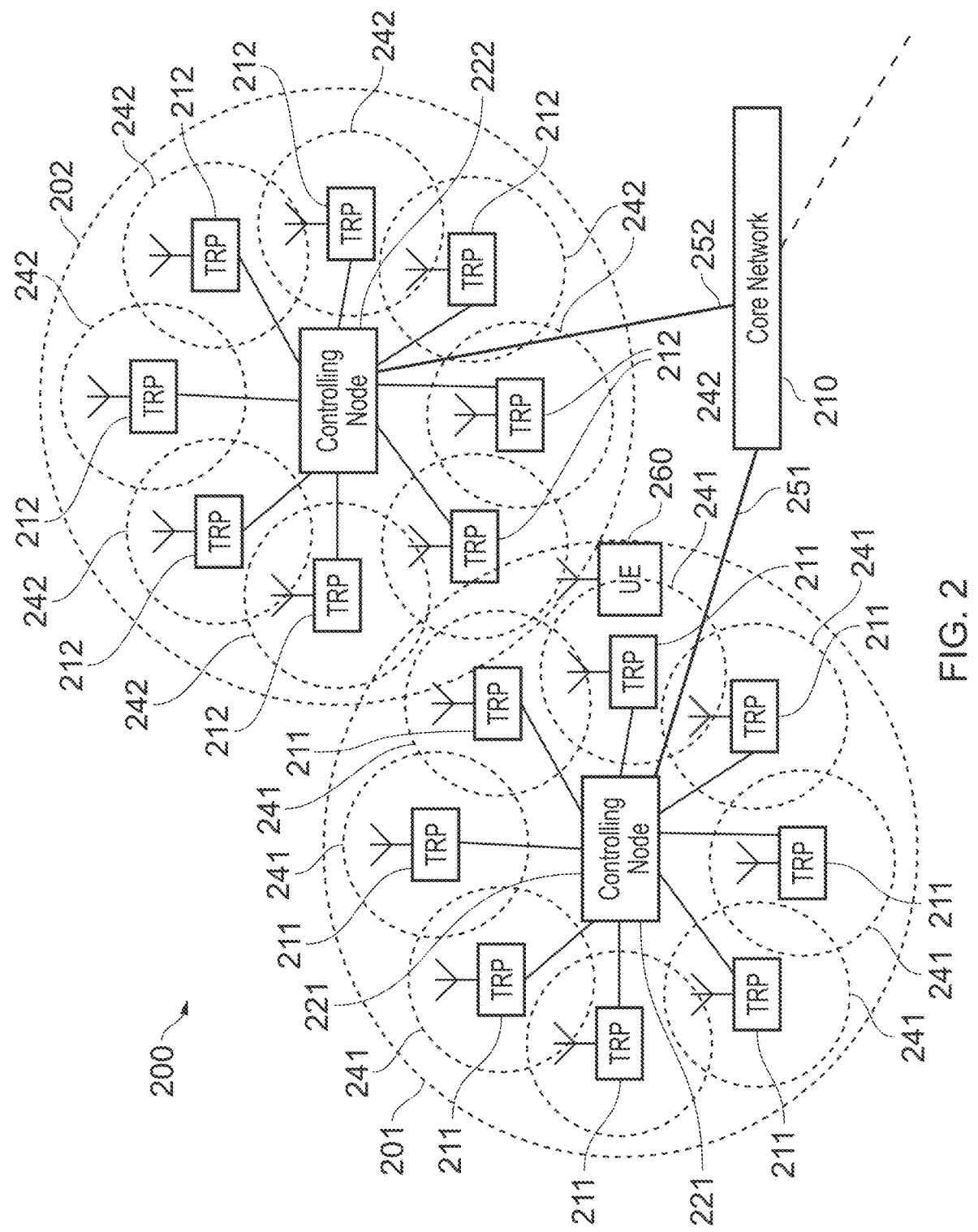
FIG. 2 schematically represents some aspects of a new radio access technology (RAT) wireless communications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Radio Resource Management (RRM) Relaxed Measurement Procedure

Figure 3:
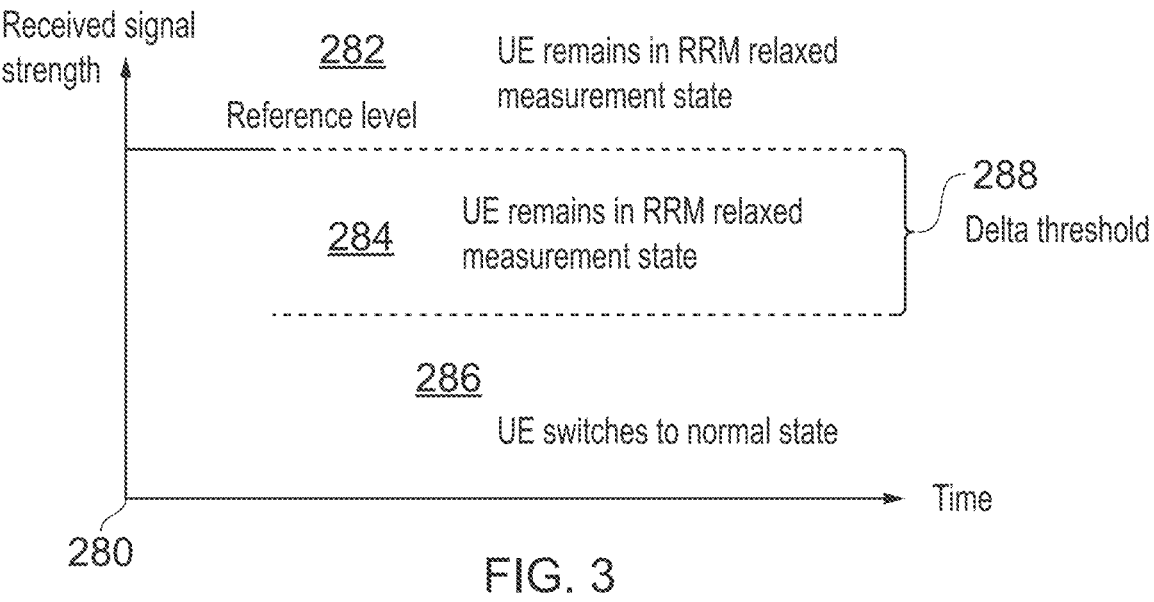
FIG. 3 provides a graphical representation of received signal strength (RSRP) measurement with respect to time illustrating a test for determining whether to remain in an RRM relaxed measurement state using a delta threshold.

Example embodiments can provide improvements in or relating to Radio Resource Management (RRM) measurements. RRM measurements are performed by communications devices (UE) in order to make an assessment of certain actions relating to its radio communications state and actions such as cell selection/reselection and handover. A UE may perform RRM measurements in RRC IDLE/CONNECTED/INACTIVE state based on a configuration provided by the network. However a technical concern is a UE's power consumption when performing these RRM measurements, which requires that the UE provide power to activate its receiver. For this reason, so called relaxed RRM measurements for UEs were introduced in LTE, mainly for UEs in an RRC_IDLE state. Relaxed measurements can be characterized as measurements which are performed at a lower frequency or indeed in a state in which no measurements are performed if certain relaxed measurement state criteria have been satisfied. LTE Idle mode specification defines relaxed measurements in TS 36.304 section 5.2.4.12. These measurement criteria include that the UE may choose not to perform intra-frequency or inter-frequency measurements when:

$$(\text{Srxlev}_{Ref} - \text{Srxlev}) < S_{SearchDeltaP},$$

Where Srxlev is a received signal strength level in which
  Srxlev=current Srxlev value of the serving cell (dB), and
Srxlev$_{Ref}$=reference Srxlev value of the serving cell (dB), set as follows:
  After selecting or reselecting a new cell, or
  If (Srxlev-Srxlev$_{Ref}$)>0, or
  If the relaxed monitoring criterion has not been met for
    T$_{SearchDeltaP}$ then the UE shall set the value of Srxlev$_{Ref}$ to the current Srxlev value of the serving cell, where T$_{SearchDeltaP}$=5 minutes, or the eDRX cycle length if eDRX is configured and the eDRX cycle length is longer than 5 minutes and less than 24 hours have passed since measurements for cell reselection were last performed, and the UE has performed intra-frequency or inter-frequency measurements for at least T$_{SearchDeltaP}$ after selecting or reselecting a new cell After determining the criteria for entering the relaxed RRM measurement state a buffer zone is used to determine whether the UE should remain in the relaxed RRM measurement state based on taking the UE's measured highest signal strength level as a reference. If the UE's reference measurement is above a predetermined threshold and the RRM measurement values subsequently taken remain after a certain period within a delta threshold value of the reference measurement level then UE may perform relaxed RRM measurements. This buffer or safe zone is then used by the UE to determine whether it should remain in the RRM relaxed measurement state so that the UE's performance and measurement accuracy is still maintained. As soon as measurements fall outside the safe or buffer zone, then the UE returns to a state in which it performs measurements with a normal frequency. An example schematic illustration is shown in FIG. 3, which provides a graphical representation of received signal strength with respect to time. The received signal strength can be for example a reference signal received power (RSRP) which is a power measured by the UE of reference signals transmitted by the wireless communications network. As shown in FIG. 3, a received signal strength value of signals (RSRP) received from a network infrastructure equipment (eNB) at time zero 280 is used according to relax measurement state criteria as a reference measurement level (Srxlev$_{Ref}$). At later times, if a current value of the received signal strength (Srxlev) remains above the reference measurement level in a zone 282 or within a delta threshold value (S$_{SearchDeltaP}$) below the measurement level in a second zone 284, then the UE can remain within the relaxed measurement state. If however a current received signal strength value falls by an amount delta threshold 288 below the reference level by greater than the delta threshold in a third zone 286, then the UE switches out of the RRM measurement relaxed state and begins to perform measurements with a greater frequency according to a normal state. Accordingly this procedure is provided for the UE to reduce its power consumption without affecting a UE mobility management functions of RRM. UE in RRC_CONNECTED mode may be configured with s-measure threshold (first evaluation threshold), which is signalled by the network. If serving cell measured value is above s-measure threshold, then UE may skip neighbouring cell measurement. If s-measure has been set to a conservative value or s-measure value is affected by the presence of number of beams then UE power consumption will be affected. So, delta threshold (second evaluation threshold) could also be useful for connected mode measurements as well.

Improvement in or Relating to UE RRM Relaxed Measurement Procedure

As indicated above, example embodiments can relate to adapting an RRM relaxed measurement procedure when a UE is configured to make a cell selection/reselection or handover measurements based on a number of radio beams which are available to receive downlink data. More particularly embodiments which will be described below concern an RRM measurement relaxed procedure for NR/5G in which the wireless communications interface is configured to transmit and received multiple beams of radio signals. An example illustration is provided in FIG. 4.

Figure 4:
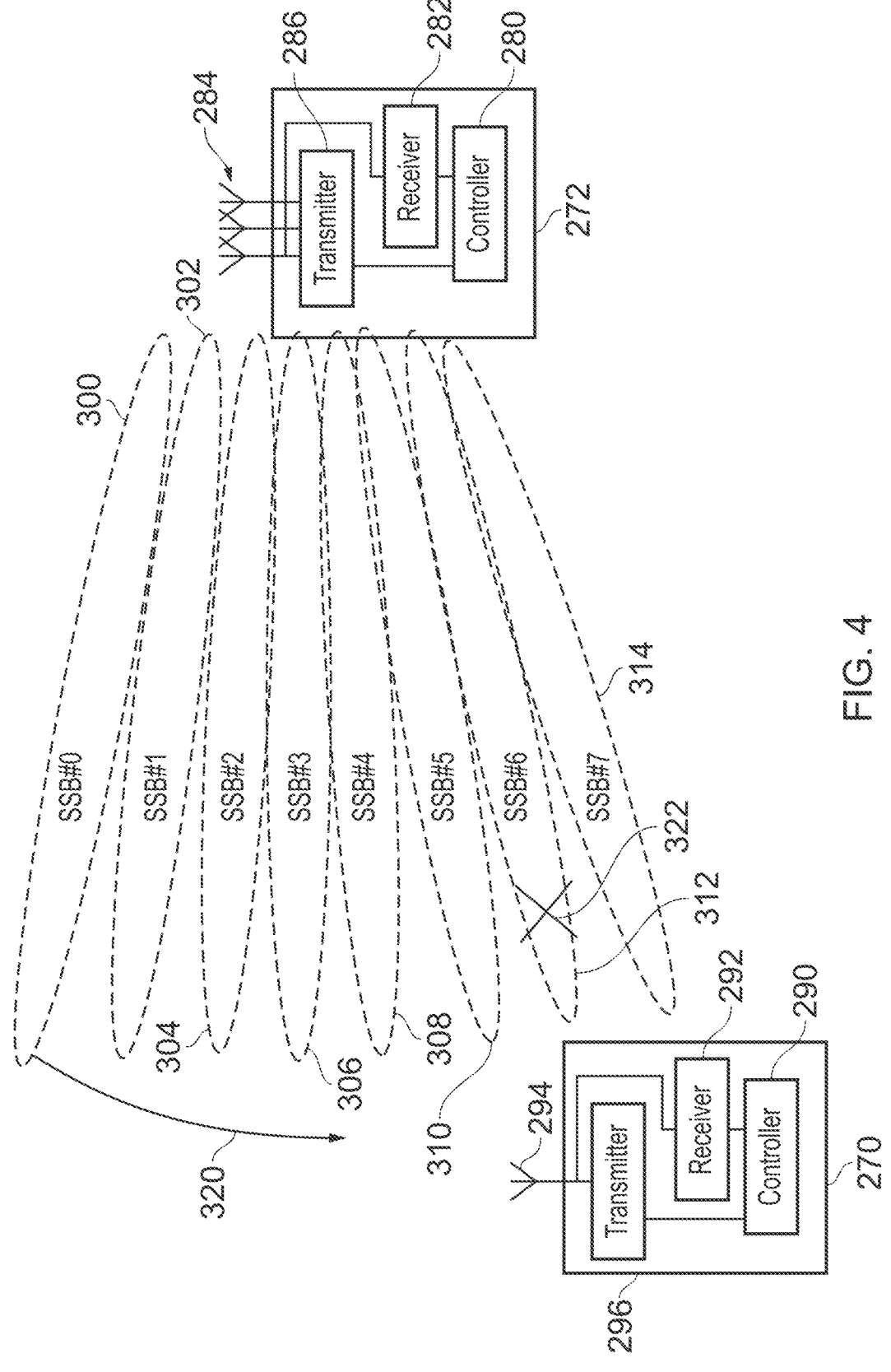
FIG. 4 is a schematic block diagram illustrating a communication device and an infrastructure equipment in more detail in which the infrastructure equipment is arranged to transmit a plurality of beams of radio signals which are displaced in one of space or time and each include a different version of a synchronisation signal.

FIG. 4 provides a more detailed view of components which form a UE 270 and an infrastructure equipment 272. The infrastructure equipment 272 may be formed from a combination of the TRP 211, 212 and distributed unit shown in FIG. 2 or may form part of an eNB or gNB of the mobile communications network shown in FIG. 1. As shown in FIG. 4 the infrastructure equipment 272 is shown to comprise a controller 280, a receiver 282 connected to the controller 280 and also connected to an antenna array comprising a plurality of antennas 284. The infrastructure 272 also includes a transmitter 286 also connected to the antenna array 284. Correspondingly the UE 270 includes a controller 290 connected to a receiver 292 which is also connected to an antenna 294. The controller 270 is also connected to a transmitter 296. As for the example shown for the infrastructure equipment 272, the antenna 294 may comprise a plurality of antennas forming an antenna array which can be used for beam forming and steering for directional transmission of signals or directional reception of signals in which signals combine coherently within the beam and therefore have increased signal strength. However for simplicity with the following explanation FIG. 4 shows only a single antenna 294 for the UE 276.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 4 as separate elements for case of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 4 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

As shown in FIG. 4 the infrastructure equipment 272 configures its antenna array 284 to transmit radio signals in beams by transmitting the same signal from each antenna of the array 284 for example with a different phase so that the signals combine coherently as a beam in a particular direction. As shown in FIG. 4 the infrastructure equipment 272 configures the transmitter to transmit a sequence of beams 300, 302, 304, 306, 308, 310, 312, 314 which are swept over a geographical location as represented by an arrow 320. Accordingly by focusing the transmitted signals into a beam, a coverage improvement is provided within a cell formed by the infrastructure equipment 272. However as represent by a X 322 not all of the beams 300-314 may be detectable by the UE, for example as a result of varying radio propagation conditions or because of the UE's location.

As a result of a time with respect to direction relationship of the beams 300, 302, 304, 306, 308, 310, 312, 314, each of the beams 300, 302, 304, 306, 308, 310, 312, 314 may transmit different content as a result of a time divided structure of a wireless access interface formed by the infrastructure equipment 272.

A wireless access interface configured according to an example of NR/5G is therefore provided with a plurality of beams of radio signals. According to current 3GPP standards, a UE is configured to perform a cell selection and reselection involving a plurality of radio beams according to a procedure defined in TS 38.304 section 5.2.1. This procedure includes conditions such as taking measurements from a maximum number of beams and a threshold with respect to which a measurement quantity for the cell is determined, by measuring a received signal strength from the beams from the same cell or neighbouring cells/frequencies depending on measurement object configuration. Measurement can be based on a highest beam measurement quantity value the beam measurement quantity value being described in TS 38.215 [11]. A measurement quantity can also be derived from a linear average of the power values of up to a maximum number of highest beam measurement quantity values above the threshold.

As explained above, RRM measurement relaxed states have been provided to reduce a power consumed by a UE when performing RRM measurements. This may be in an Idle or a Connected mode. As described in 3GPP RAN1 Technical Report (TR38.840), for an example in which multiple beams are present in a cell, a UE may be configured to adapt autonomous RRM measurements in the time-domain using a gNB controlled thresholds and parameters. The following thresholds and corresponding adaptation schemes can be considered:

A RSRP threshold for UE adapting RRM measurement period,

A RSRP threshold for UE adapting RRM number of samples within a measurement period, A RSRP threshold and a RSRP variation threshold within a period of time, and based on that, UE can adapt the measurement or report period.

A RSRP variation threshold within a period of time, and based on that, the UE can adapt the measurement or report period.

A threshold for UE adapting RRM measurement period and the threshold can be at least one of the following:

The amount of time during which the UE stays with a specific cell or beam (for RRM measurement)

A UE's active Transmission Configuration Indicator TCI state for PDCCH does not change for specific time period.

The number of handovers/reselections for certain period.

Figure 5:
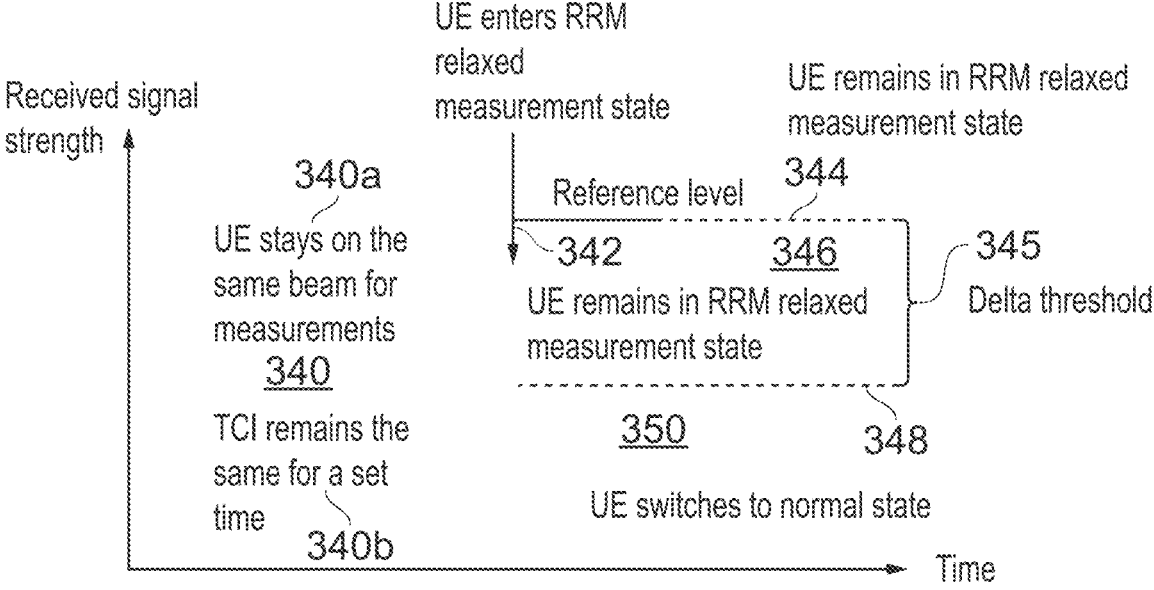
FIG. 5 is a graphical representation of a relationship between received signal strength with respect to time illustrating an example arrangement for entering an RRM relaxed measurement state and determining whether to stay in the RRM relaxed measurement state.

FIG. 5 provides a graphical illustration of one example in which a UE enters into a relaxed measurement state and determines whether it should remain in the relaxed mea-surement state based on a comparison between received signal strength measurements of a reference level and a current level. As shown in FIG. 5, in a first zone 340 the UE determines whether a Transmission Configuration Indicator (TCI) state for a PDCCH measurement remains the same for a pre-determined period 340*a* or if the UE stays on the same cell or beam for a pre-determined period 340*b*. If so then UE enters a relaxed RRM measurement state as represented by an arrow 342. At this point the UE may determine a reference received signal strength measurement level 344. As for the example of LTE, a delta threshold 345 from LTE IDLE mode can be used to determine whether the UE can remain in the relaxed RRM measurement state. That is to say, as with the example of FIG. 3, unless the received signal strength measurements remain in zone 346 formed with the delta threshold 348, then the UE leaves the relaxed mea-surement state from zone 350 once the received signal strength below the reference level by the delta threshold amount 348.

Relaxed RRM Measurements Using Multiple Beams

Figure 6:
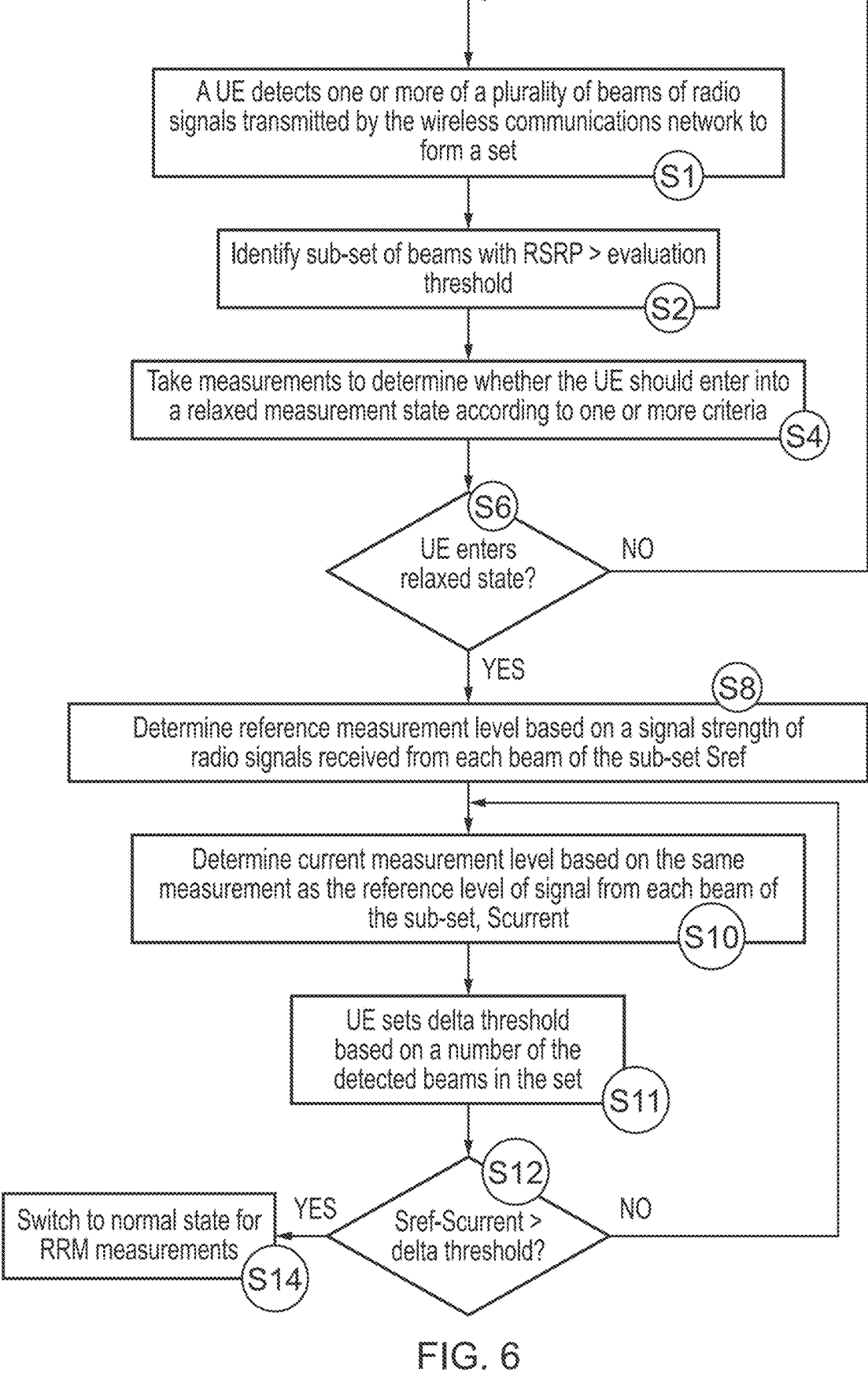
FIG. 6 is a flow diagram illustrating an example operation of a communications device according to an example embodiment.

Embodiments of the present technique can provide a more dynamic arrangement for a UE to determine whether to remain in an RRM measurement relaxed state once entered. An example embodiment is illustrated in FIG. 6, which is summarised as follows:

In a first step S1, a UE detects one or more of a plurality of beams of radio signals transmitted by the wireless communications network, the one or more beams of the radio signals which have been detected form a set of one or more detected beams of radio signals from the plurality of beams of radio signals transmitted from the wireless communications network. In a second step S2, the UE then determines whether a received signal strength of the radio signals of each of the one or more beams of the set of detected beams exceeds a first evaluation threshold and identifies a sub-set of the set of detected beams of radio signals which can be used to receive data carried by the radio signals of the beam for which the received signal strength exceeds the first evaluation threshold. The UE then in a next step S4 takes one or more measurements to determine whether one or more criteria for entering an RRM measurement relaxed state have been satisfied. The UE then deter-mines at a decision point S6 whether it should enter a relaxed RRM measurement state in which the commu-nications device reduces an amount of attempted mea-surements of the plurality of beams of radio signals compared with a normal state according to one or more relaxed measurement state criterion. If the UE deter-mines that it should enter the RRM measurement relaxed state, then at step S8, the UE determines a reference measurement level based on a signal strength of the radio signals of the sub-set of beams of radio signals or indicated by the network (s-measure in connected mode). Otherwise processing proceeds again to step S1.

In a next step of the process S10 the UE determines a current measurement level based on a signal strength of the radio signals of the sub-set of beams of radio signals after determining the reference measurement level. At step S11, the UE sets a second delta threshold based on a number of the detected beams in the set of the detected beams. Then at a decision point S12, the UE determines whether the it should remain in the relaxed radio measurement state by comparing a difference between the reference measurement level and the cur-rent measurement level with a second delta threshold. If not then the UE switches back to a normal state in which it increases a number and frequency of RRM measurements S14. Otherwise processing proceeds back to step S10. However, according to example embodiments at a step S12 the second delta threshold is set dynamically by the communications device according to a number of the detected beams of the radio signals in the set of detected beams of radio signals determined at step S1.

According to example embodiments of the present tech-nique an RRM measurements relaxed state is provided with a delta threshold value to be used while comparing the reference measurement with current measurement values, which varies with a number of beams which can be detected. If for example the UE can detect ten beams which are above a detection threshold then the delta value used to prepare the buffer or safe zone should be smaller then when less than ten can be detected. If however the UE can only detect a single beam then the delta threshold should be relatively high.

In some embodiments, the RRM measurements can be an average of received signal strength measurements such as RSRP measurements of all of the beams above an evaluation threshold. The evaluation threshold is set to determine whether a beam can be used to communicate data. If the UE can detect ten such beams above the evaluation threshold, then the UE calculates a difference in the average RSRP of these ten beams over two time periods and compare a difference in this measured average with this delta threshold value, which is set by the UE dependent on a number of the beams which it can detect. That is;

If

Average RSRP of 10 beams at time t1−Average RSRP of 10 beams at time t2<delta value (Nd)

then the UE can perform relaxed RRM measurement, else the UE reverts to normal measurement.

Here delta value (Nd) represents a dynamic adaptation of the threshold delta value by the UE as a function of the number of detected beams Nd.

Figure 7:
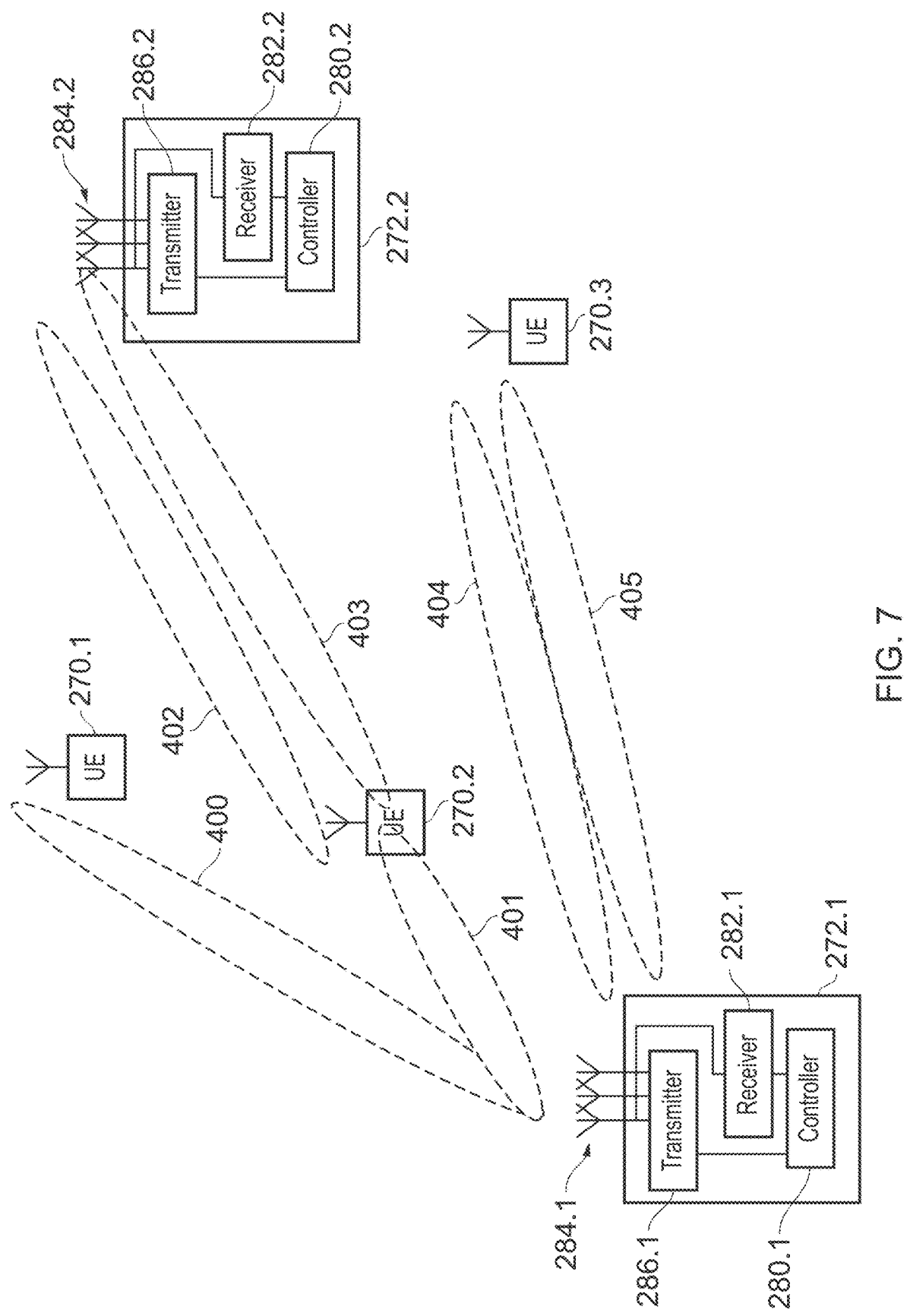
FIG. 7 is a schematic block diagram of two network infrastructure equipment and three communications devices at different locations illustrating that each communications device at different locations can detect different numbers of beams which is used to adapt a delta threshold for determining whether to remain in a radio resource management relaxed measurement state.

FIG. 7 provides a more detailed example illustration of an adaptation of the delta threshold value by the UE depending on a location of the UE. FIG. 7 shows two gNBs 272.1, 272.2 which have a corresponding configuration to that of the eNB shown in FIG. 4. Furthermore FIG. 7 illustrates a position of three UEs 270.1, 270.2, 270.3 at different location, which results in each of the UEs 270.1, 270.2, 270.3 detecting different ones of a plurality of beams 400, 401, 402, 403, 404, 405 of radio signals transmitted by the two gNBs 272.1, 272.2. As represented in FIG. 7, a first of the UEs 270.1 can only detect one beam 400 transmitted by the gNB 272.1, a second UE 270.2 can detect a beam 401 transmitted by one gNB 272.1 and two of the beams 402, 403 transmitted by the second of the gNB 272.2. A third of the UEs 270.3 can detect two of the beams 404, 405 transmitted by the first gNB 272.1.

As can be appreciated from the example embodiment illustrated in FIG. 7, UEs at different locations can detect different numbers of beams. Then having the same delta threshold might result in each UE missing certain beams from measurements or having inaccurate measurements for certain beams. So, as an example, when the UE 270.1 has detected only a single beam then the delta threshold could be higher e.g. 6 dB. For the UE 270.2 which has detected three beams 401, 402, 403 then a delta threshold could be 3 dB or a lower value. Hence when a UE has detected many beams, it needs to be more stringent about choosing the correct beam and hence is configured to be less likely to relax RRM measurements. On the other hand when the UE has only detected a single beam, the criterion to relax RRM measurements is more lax, because the UE does not have other beams to measure anyway.

In terms of configuration of the relationship between the number of detected beams and the delta threshold, one problem is that the network will not be aware of the number of detected beams by the UE. The network can provide a guideline for adapting the delta threshold based on the detected number of beams, and so can predict the likely number of beams used to set the delta threshold value.

In another embodiment, the delta threshold can be linked to the number of beams in an active TCI state or configured TCI state. Using an active TCI state is more beneficial because it is based on actual UE radio conditions.

In order to improve signalling efficiency, the delta threshold steps are linked to the number of detected beams in steps. In its simplest form, one example of this relationship can be defined by the table below, such as that illustrated below:

| Number of detected beams | Delta threshold |
|---|---|
| <3 beams | 6 dB |
| >=3 beams | 3 dB |

The elements in the table can be pre-defined in a system specification or these can be signaled via RRC signalling.

Alternatively, the delta threshold is calculated as a mathematical relationship, such as:

Delta threshold=(1/number of detected beams)*basic delta, where basic delta is for the case of 1 beam is available Although it has been described that for a larger number of beams, a smaller delta threshold is applied, in some embodiments, the opposite is implemented, that is to say that for a larger number of beams, a larger delta threshold is applied. This example embodiment recognizes that if the UE sees a large number of beams, then it may be less likely to miss detect the wireless communications interface than if the UE is not connected to a best of the beams if the best beam fails, there is always another beam to which the UE can easily switch. However if the UE can only see a single beam, it needs carefully to monitor that beam, because if it loses that beam, it is difficult to fall-back to a different beam.

Embodiments of the present technique as described above with reference to the 5G architecture can be applied to other architectures as well as the 4G architecture. Furthermore although example embodiments have been described with two radio beams it will be appreciated that this is just an example and a UE can select multiple radio beams for synchronising with the wireless access interface.

Various aspects and features of the present technique are defined in the appended claims. Various features of embodiments of the present technique are defined by the following numbered paragraphs:

Paragraph 1. A method of operating a communications device for communicating data via a wireless communications network, the method comprising detecting one or more of a plurality of beams of radio signals transmitted by the wireless communications network, the one or more beams of the radio signals which have been detected forming a set of one or more detected beams of radio signals from the plurality of beams of radio signals transmitted from the wireless communications network, identifying a sub-set of the set of detected beams of radio signals which can be used to receive data carried by the radio signals of the beam for which the received signal strength of the radio signals of the beam exceeds a first evaluation threshold, entering a relaxed radio measurement state in which the communications device reduces an amount of attempted measurements of the plurality of beams of radio signals compared with a normal state according to one or more relaxed measurement state criteria, and when in the relaxed radio measurement state, determining a reference measurement level based on a signal strength of the radio signals of the sub-set of beams of radio signals, determining a current measurement level based on a signal strength of the radio signals of the sub-set of beams of radio signals having a signal strength which exceeds the first evaluation threshold after determining the reference measurement level, and determining whether the communications device should remain in the relaxed radio measurement state by comparing a difference between the reference measurement level and the current measurement level with a second delta threshold, wherein the second delta threshold is set dynamically by the communications device according to a number of the detected beams of the radio signals in the set of detected beams of radio signals.

Paragraph 2. A method of paragraph 1, the method comprising setting the second delta threshold to be a higher value when the number of beams in the set of the detected beams of the radio signals is a lower number than a higher number.

Paragraph 3. A method of paragraph 2, wherein the setting the second delta threshold comprises setting the second delta threshold as a reciprocal of the number of beams in the set of the detected beams of radio signals multiplied by a predetermined constant.

Paragraph 4. A method of paragraph 2, wherein the setting the second delta threshold comprises setting the second delta threshold from a look-up table based on the number of beams in the set of the detected beams of radio signals.

Paragraph 5. A method of paragraph 1, the method comprising setting the second delta threshold to be a higher value when the number of beams in the set of the detected beams of the radio signals is a higher number than a lower number.

Paragraph 6. A method of any of paragraphs 1 to 5, wherein the setting the second delta threshold comprises setting the delta threshold according to conditions received from the wireless communications network.

Paragraph 7. A method of any of paragraphs 1 to 6, wherein the detecting the one or more beams of radio signals of the set comprises identifying one of more of the plurality of beams of radio signals transmitted by the wireless communications network which are in an active transmission configuration indicator state providing an indication of radio conditions of the beam.

Paragraph 8. A method of any of paragraphs 1 to 7, wherein the detecting the one or more of a plurality of beams of radio signals transmitted by the wireless communications network comprises determining whether a received signal strength of radio signals transmitted in the beam with a beam indicator exceeds a third detection threshold.

Paragraph 9. A method of any of paragraphs 1 to 8, wherein each of the plurality of beams of radio signals is transmitted periodically according to a time divided structure of a wireless access interface provided by the wireless communications network in at least one of different spatial directions and at different times.

Paragraph 10. A method of any of paragraphs 1 to 9, wherein the determining the reference measurement level comprises calculating an average value of the signal strength of the radio signals of the sub-set of beams of radio signals, and the determining the current measurement level comprises calculating the average value of the signal strength of the radio signals of the sub-set of beams of radio signals at a later time.

Paragraph 11. A communications device for communicating data via a wireless communications network, the communications device comprising transmitter circuitry configured to transmit signals via a wireless access interface provided by the wireless communications network, receiver circuitry configured to receive signals transmitted via the wireless access interface, and controller circuitry configured to control the transmitter circuitry and the receiver circuitry to transmit or to receive the signals, the control circuitry being configured to control the receiver circuitry to detect one or more of a plurality of beams of radio signals transmitted by the wireless communications network, the one or more beams of the radio signals which have been detected forming a set of one or more detected beams of radio signals from the plurality of beams of radio signals transmitted from the wireless communications network, to identify a sub-set of the set of detected beams of radio signals which can be used to receive data carried by the radio signals of the beam for which the received signal strength of the radio signals exceeds a first evaluation threshold, to enter a relaxed radio measurement state in which the communications device reduces an amount of attempted measurements of the plurality of beams of radio signals compared with a normal state according to one or more relaxed measurement state criteria, and when in the relaxed radio measurement state, to determine a reference measurement level based on a signal strength of the radio signals of the sub-set of beams of radio signals, to determine a current measurement level based on a signal strength of the radio signals of the sub-set of beams of radio signals having a signal strength which exceeds the first evaluation threshold after determining the reference measurement level, and to determine whether the communications device should remain in the relaxed radio measurement state by comparing a difference between the reference measurement level and the current measurement level with a second delta threshold, wherein the second delta threshold is set dynamically by the communications device according to a number of the detected beams of the radio signals in the set of detected beams of radio signals.

Paragraph 12. A communications device of paragraph 11, wherein the controller circuitry is configured to set the second delta threshold to be a higher value when the number of beams in the set of the detected beams of the radio signals is a lower number than a higher number.

Paragraph 13. A communications device of paragraph 12, wherein the controller circuitry is configured to set the second delta threshold as a reciprocal of the number of beams in the set of the detected beams of radio signals multiplied by a predetermined constant.

Paragraph 14. A communications device of paragraph 12, wherein the controller circuitry is configured to set the second delta threshold from a look-up table based on the number of beams in the set of the detected beams of radio signals.

Paragraph 15. Circuitry for a communications device comprising transmitter circuitry configured to transmit signals via a wireless access interface provided by the wireless communications network, receiver circuitry configured to receive signals transmitted via the wireless access interface, and controller circuitry configured to control the transmitter circuitry and the receiver circuitry to transmit or to receive the signals, the control circuitry being configured to control the receiver circuitry to detect one or more of a plurality of beams of radio signals transmitted by the wireless communications network, the one or more beams of the radio signals which have been detected forming a set of one or more detected beams of radio signals from the plurality of beams of radio signals transmitted from the wireless communications network, to identify a sub-set of the set of detected beams of radio signals which can be used to receive data carried by the radio signals of the beam for which the received signal strength of the radio signals exceeds a first evaluation threshold, to enter a relaxed radio measurement state in which the communications device reduces an amount of attempted measurements of the plurality of beams of radio signals compared with a normal state according to one or more relaxed measurement state criteria, and when in the relaxed radio measurement state, to determine a reference measurement level based on a signal strength of the radio signals of the sub-set of beams of radio signals, to determine a current measurement level based on a signal strength of the radio signals of the sub-set of beams of radio signals after determining the reference measurement level, and to determine whether the communications device should remain in the relaxed radio measurement state by comparing a difference between the reference measurement level and the current measurement level with a second delta threshold, wherein the second delta threshold is set dynamically by the communications device according to a number of the detected beams of the radio signals in the set of detected beams of radio signals.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009

[2] RP-160671, "New SID Proposal: Study on New Radio Access Technology," NTT DOCOMO, RAN #71

[3] R1-165364, "Support for Beam Based Common Control Plane", Nokia, Alcatel-Lucent Shanghai Bell, RAN1 #85

[4] RP-181463, "Study on UE Power Saving for NR", RAN

The invention claimed is:

1. A communications device for communicating data via a wireless communications network, the communications device comprising:

circuitry configured to detect one or more of a plurality of beams of radio signals transmitted by the wireless communications network, the one or more of the plurality of beams of the radio signals which have been detected forming a set of one or more detected beams of radio signals from the one or more of the plurality of beams of radio signals transmitted from the wireless communications network;

identify a sub-set of the set of one or more detected beams of radio signals which can be used to receive data carried by the radio signals of a beam for is replaced by which a received signal strength of the radio signals of the beam exceeds a first evaluation threshold;

enter a relaxed radio measurement state in which the communications device reduces an amount of attempted measurements of the one or more of the plurality of beams of radio signals compared with a normal state according to one or more relaxed measurement state criteria, and when in the relaxed radio measurement state, determine a reference measurement level based on a signal strength of the radio signals of the sub-set of beams of radio signals, determine a current measurement level based on a signal strength of the radio signals of the sub-set of beams of radio signals having a signal strength which exceeds the first evaluation threshold after determining the reference measurement level; and determine whether the communications device should remain in the relaxed radio measurement state by comparing a difference between the reference measurement level and the current measurement level with a second delta threshold.

2. The communications device of claim 1, wherein the second delta threshold is set dynamically according to a number of the detected beams of the radio signals in the set of one or more detected beams of radio signals.

3. The communications device of claim 2, wherein the second delta threshold is set to be a first value when the number of beams in the set of one or more detected beams of the radio signals is a first number; the second delta threshold is set to be a second value when the number of beams in the set of one or more detected beams of the radio signals is a second number, the first value is greater than the second value, and the first number is lower than the second number.

4. The communications device of claim 3, wherein the second delta threshold is set as a reciprocal of the number of beams in the set of one or more detected beams of radio signals multiplied by a predetermined constant.

5. The communications device of claim 3, wherein the second delta threshold is set from a look-up table based on the number of beams in the set of one or more detected beams of radio signals.

6. The communications device of claim 1, wherein the second delta threshold is set to be a first value when the number of beams in the set of one or more detected beams of the radio signals is a first number, the second delta threshold is set to be a second value when the number of beams in the set of one or more detected beams of the radio signals is a second number, the first value is greater than the second value, and the first number is greater than the second number.

7. The communications device of claim 1, wherein the circuitry is configured to detect the one or more of the plurality of beams of radio signals by identifying one or more of the plurality of beams of radio signals transmitted by the wireless communications network which are in an active transmission configuration indicator state providing an indication of radio conditions of the one or more of the plurality of beams.

8. The communications device of claim 1, wherein the circuitry is configured to detect the one or more of the plurality of beams of radio signals transmitted by the wireless communications network by determining whether a received signal strength of radio signals transmitted in a beam with a beam indicator exceeds a third detection threshold.

9. The communications device of claim 1, wherein each of the one or more of the plurality of beams of radio signals is transmitted periodically according to a time divided structure of a wireless access interface provided by the wireless communications network in at least one of different spatial directions and at different times.

10. The communications device of claim 1, wherein the circuitry is configured to determine the reference measurement level by calculating an average value of is replaced by the received signal strength of the radio signals of the sub-set of the set of one or more detected beams of radio signals, and the determining the current measurement level comprises calculating the average value of the received signal strength of the radio signals of the sub-set of the set of one or more detected beams of radio signals at a later time.

11. A method of operating a communications device for communicating data via a wireless communications network, the method comprising:

detecting one or more of a plurality of beams of radio signals transmitted by the wireless communications network, the one or more of the plurality of beams of the radio signals which have been detected forming a set of one or more detected beams of radio signals from the one or more of the plurality of beams of radio signals transmitted from the wireless communications network, identifying a sub-set of the set of one or more detected beams of radio signals which can be used to receive data carried by the radio signals of a beam for which a received signal strength of the radio signals of the beam exceeds a first evaluation threshold, entering a relaxed radio measurement state in which the communications device reduces an amount of attempted measurements of the one or more of the plurality of beams of radio signals compared with a normal state according to one or more relaxed measurement state criteria, and when in the relaxed radio measurement state, determining a reference measurement level based on a signal strength of the radio signals of the sub-set of beams of radio signals, determining a current measurement level based on a signal strength of the radio signals of the sub-set of beams of radio signals having a signal strength which exceeds the first evaluation threshold after determining the reference measurement level, and determining whether the communications device should remain in the relaxed radio measurement state by comparing a difference between the reference measurement level and the current measurement level with a second delta threshold.

12. The method of claim 11, wherein the second delta threshold is set according to a number of the detected beams of the radio signals in the set of one or more detected beams of radio signals.

13. The method of claim 12, further comprising:

setting the second delta threshold to be a first value when the number of beams in the set of one or more detected beams of the radio signals is a first number; and setting the second delta threshold to be a second value when the number of beams in the set of one or more detected beams of the radio signals is a second number, wherein the first value is greater than the second value, and the first number is lower than the second number.

14. The method of claim 13, wherein setting the second delta threshold comprises setting the second delta threshold as a reciprocal of the number of beams in the set of one or more detected beams of radio signals multiplied by a predetermined constant.

15. The method of claim 13, wherein setting the second delta threshold comprises setting the second delta threshold from a look-up table based on the number of beams in the set of one or more detected beams of radio signals.

16. The method of claim 11, further comprising:

setting the second delta threshold to be a first value when the number of beams in the set of one or more detected beams of the radio signals is a first number, setting the second delta threshold to be a second value when the number of beams in the set of one or more detected beams of the radio signals is a second number, wherein the first value is greater than the second value, and the first number is greater than the second number.

17. The method of claim 11, wherein detecting the one or more of the plurality of beams of radio signals comprises identifying one or more of the plurality of beams of radio signals transmitted by the wireless communications network which are in an active transmission configuration indicator state providing an indication of radio conditions of the one or more of the plurality of beams.

18. The method of claim 11, wherein detecting the one or more of the plurality of beams of radio signals transmitted by the wireless communications network comprises determining whether a received signal strength of radio signals transmitted in a beam with a beam indicator exceeds a third detection threshold.

19. The method of claim 11, wherein each of the one or more of the plurality of beams of radio signals is transmitted periodically according to a time divided structure of a wireless access interface provided by the wireless communications network in at least one of different spatial directions and at different times.

20. Circuitry for a communications device for communicating data via a wireless communications network, the circuitry configured to:

detect one or more of a plurality of beams of radio signals transmitted by the wireless communications network, the one or more of the plurality of beams of the radio signals which have been detected forming a set of one or more detected beams of radio signals from the one or more of the plurality of beams of radio signals transmitted from the wireless communications network;

identify a sub-set of the set of one or more detected beams of radio signals which can be used to receive data carried by the radio signals of a beam for which a received signal strength of the radio signals of the beam exceeds a first evaluation threshold;

enter a relaxed radio measurement state in which the communications device reduces an amount of attempted measurements of the one or more of the plurality of beams of radio signals compared with a normal state according to one or more relaxed measurement state criteria, and when in the relaxed radio measurement state, determine a reference measurement level based on a signal strength of the radio signals of the sub-set of beams of radio signals, determine a current measurement level based on a signal strength of the radio signals of the sub-set of beams of radio signals having a signal strength which exceeds the first evaluation threshold after determining the reference measurement level; and determine whether the communications device should remain in the relaxed radio measurement state by comparing a difference between the reference measurement level and the current measurement level with a second delta threshold.

* * * * *